United States Patent
Altonen et al.

(10) Patent No.: US 9,815,233 B2
(45) Date of Patent: *Nov. 14, 2017

(54) METHOD AND APPARATUS FOR SUBSTANTIALLY CONSTANT PRESSURE INJECTION MOLDING OF THINWALL PARTS

(71) Applicant: iMFLUX Inc., Cincinnati, OH (US)

(72) Inventors: Gene Michael Altonen, West Chester, OH (US); Michael Thomas Dodd, Florence, KY (US); Natalia Maria Ramon Martinez, West Chester, OH (US); Kimberly Nichole McConnell, Morrow, OH (US); Danny David Lumpkin, Cincinnati, OH (US); Vincent Sean Breidenbach, Lebanon, OH (US); John Russell Lawson, Cincinnati, OH (US)

(73) Assignee: IMFLUX, INC., Hamilton, OH (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/054,655

(22) Filed: Feb. 26, 2016

(65) Prior Publication Data

US 2016/0176084 A1     Jun. 23, 2016

Related U.S. Application Data

(62) Division of application No. 13/476,584, filed on May 21, 2012, now Pat. No. 9,272,452.

(Continued)

(51) Int. Cl.
*B29C 45/77* (2006.01)
*B29C 45/00* (2006.01)
*B29C 45/18* (2006.01)

(52) U.S. Cl.
CPC .......... *B29C 45/0046* (2013.01); *B29C 45/18* (2013.01); *B29C 45/77* (2013.01);
(Continued)

(58) Field of Classification Search
CPC ........... B29C 2945/76026; B29C 2945/76498; B29C 2945/76859; B29C 45/0046; B29C 45/18; B29C 45/77
See application file for complete search history.

(56) References Cited

U.S. PATENT DOCUMENTS

| | | |
|---|---|---|
| 4,219,322 A | 8/1980 | Chang et al. |
| 5,350,288 A | 9/1994 | Kimoto et al. |

(Continued)

FOREIGN PATENT DOCUMENTS

| | | |
|---|---|---|
| DE | 2427969 A1 | 1/1976 |
| DE | 102009046835 A1 | 5/2011 |

(Continued)

OTHER PUBLICATIONS

"Specialized Aluminum Products for Tool and Mold Applications", May/Jun. 2003 issue of Aluminum Now journal of The Aluminum Association, Inc., 4 pages.

(Continued)

*Primary Examiner* — Jill L Heitbrink
(74) *Attorney, Agent, or Firm* — Marshall, Gerstein & Borun LLP

(57) ABSTRACT

A substantially constant pressure injection molding method and machine that forms molded parts by injecting molten thermoplastic material into a mold cavity at a substantially constant pressure. As a result, the mold cavity is filled with molten thermoplastic material by advancing a continuous flow front of thermoplastic material from a gate to an end of the mold cavity.

13 Claims, 8 Drawing Sheets

Related U.S. Application Data

(60) Provisional application No. 61/488,564, filed on May 20, 2011, provisional application No. 61/488,547, filed on May 20, 2011, provisional application No. 61/488,553, filed on May 20, 2011, provisional application No. 61/488,555, filed on May 20, 2011, provisional application No. 61/488,559, filed on May 20, 2011, provisional application No. 61/602,650, filed on Feb. 24, 2012, provisional application No. 61/602,781, filed on Feb. 24, 2012, provisional application No. 61/641,349, filed on May 2, 2012.

(52) U.S. Cl.
CPC ............... *B29C 2945/76026* (2013.01); *B29C 2945/76498* (2013.01); *B29C 2945/76859* (2013.01)

(56) References Cited

U.S. PATENT DOCUMENTS

| | | | |
|---|---|---|---|
| 5,407,342 | A | 4/1995 | Boucher et al. |
| 5,411,686 | A | 5/1995 | Hata |
| 5,419,858 | A | 5/1995 | Hata et al. |
| 5,478,520 | A | 12/1995 | Kasai et al. |
| 5,518,389 | A | 5/1996 | Nonomura et al. |
| 5,716,561 | A | 2/1998 | Guergov |
| 5,728,329 | A | 3/1998 | Guergov |
| 5,853,630 | A | 12/1998 | Hettinga |
| 5,902,525 | A | 5/1999 | Hettinga |
| 5,935,505 | A | 8/1999 | Whetten et al. |
| 6,090,318 | A | 7/2000 | Bader et al. |
| 6,372,162 | B1 | 4/2002 | Szczech |
| 6,464,909 | B1 | 10/2002 | Kazmer et al. |
| 6,616,871 | B1 | 9/2003 | Limura et al. |
| 6,824,379 | B2 | 11/2004 | Doyle et al. |
| 7,419,625 | B2 | 9/2008 | Vasapoli et al. |
| 7,771,631 | B2 | 8/2010 | Honma et al. |
| 7,785,090 | B2 | 8/2010 | Amano et al. |
| 7,910,029 | B2 | 3/2011 | Koumaru |
| 8,235,694 | B2 | 8/2012 | Nam |
| 8,828,291 | B2 | 9/2014 | Altonen et al. |
| 9,272,452 | B2 * | 3/2016 | Altonen ............... B29C 45/77 |
| 2001/0013672 | A1 | 8/2001 | Kawamura et al. |
| 2008/0064805 | A1 | 3/2008 | Uosaki et al. |
| 2008/0143006 | A1 | 6/2008 | Honma et al. |
| 2009/0315205 | A1 | 12/2009 | Koumaru |
| 2012/0035327 | A1 | 2/2012 | Ciarafoni et al. |
| 2012/0291885 | A1 | 11/2012 | Altonen et al. |
| 2012/0292823 | A1 | 11/2012 | Altonen et al. |
| 2012/0294963 | A1 | 11/2012 | Altonen et al. |
| 2012/0295049 | A1 | 11/2012 | Altonen et al. |
| 2012/0295050 | A1 | 11/2012 | Altonen et al. |
| 2012/0328724 | A1 | 12/2012 | Altonen et al. |
| 2012/0329948 | A1 | 12/2012 | Altonen et al. |
| 2013/0069280 | A1 | 3/2013 | Altonen et al. |
| 2013/0295219 | A1 | 11/2013 | Neufarth et al. |
| 2013/0295220 | A1 | 11/2013 | Neufarth et al. |

FOREIGN PATENT DOCUMENTS

| | | |
|---|---|---|
| GB | 2164895 A | 4/1986 |
| JP | 60127125 | 7/1985 |
| JP | 2098417 | 4/1990 |
| JP | 3079317 | 4/1991 |
| JP | H04272818 A | 9/1992 |
| JP | 1993-009907 | 2/1993 |
| JP | 7223242 | 8/1995 |
| JP | 1996-132500 | 5/1996 |
| JP | H09076320 | 3/1997 |
| JP | 1997-117942 | 5/1997 |
| JP | H10146869 A | 6/1998 |
| JP | 11262936 | 9/1999 |
| JP | 2000280276 A | 10/2000 |
| JP | 2005215497 A | 8/2005 |
| JP | 4126214 B2 | 7/2008 |
| JP | 5006914 B2 | 8/2012 |

OTHER PUBLICATIONS

A L Kelly, et al, "The effect of copper alloy mold tooling on the performance of the injection molding process", online article from the Free Library, 10 pages, http://www.thefreelibrary.com/The+effect+of+copper-Falloy+mold-Hooling-Fon-Fthe+performance.

Alcoa:"QC-10 The aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.

AMPCO Metal Inc., "Procurable Alloys", online article Nov. 2011, 5 pages, http://www.modernmetals.com/item/10715-procurable-alloys.html.

AMPCO Metal, "Ampcoloy®944", brochure, 2 pages, www.ampcometal.com.

AMPCO Metal, "Ampcoloy®944: A new copper-silicon-chromium alloy for the Moldmaking Industry", brochure, 2 pages, www.ampcometal.com.

Clinton Aluminum & Stainless Steel, "Why aluminum mold?" presentation, Oct. 30, 2006, 20 pages, toll free # 800-826-3370.

David Bank et al., "Why Plastic Flows Better in Aluminum Injection Molds", plastics technology article Sep. 2008, 8 pages.

David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.

European Tool & Mould Making ETMM, "High strength, hardness, thermal conductivity characterize copper mould making alloy", online article Dec. 9, 2011, 2 pages, http://www.etmm-online.com/materials/articles/353445/.

Homes W et al: "Spritzgiessprozesse in Echtzeit Regeln Eine Neue Technik Zur Aktiven Angussbalancierung", Kunstoffe International. Carl Hanser Verlag, Munchen DE, vol. 91, No. 1, Jan. 1, 2001, pp. 68-70.

International Search Report, U.S. Appl. No. 13/476,045, dated Aug. 16, 2012, 12 pages.

International Search Report, U.S. Appl. No. 13/476,045, dated Aug. 17, 2012, 14 pages.

International Search Report, U.S. Appl. No. 13/476,073, dated Sep. 3, 2012, 16 pages.

International Search Report, U.S. Appl. No. 13/476,178, dated Aug. 17, 2012, 13 pages.

International Search Report, U.S. Appl. No. 13/476,197, dated Aug. 16, 2012, 11 pages.

International Search Report, U.S. Appl. No. 13/476,584, dated Aug. 17, 2012, 13 pages.

International Search Report, U.S. Appl. No. 13/682,456, dated Aug. 2, 2013, 11 pages.

Joseph Pryweller, "Aluminum Injection Mold", online article from PlasticsNews.com, Jan. 13, 2003, 2 pages, http://aluminuminjectionmold.com/articles.html.

Li et al., Automatic Layout Design of Plastic Injection Mould Cooling System, Computer-aided Design 37 (2005) 645-662.

Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.

Rhoda Miel, "Aluminating Tooling", *PlasticsNews.com* online article Apr. 27, 2009, 2 pages, http://www.plasticsnews.com/article/20090427/NEWS/304279985/aluminating-tooling.

Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.

(56) References Cited

OTHER PUBLICATIONS

Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.
Suh et al., "Structure Development of Various Polyolefins in Injection Molding", Antec 2006, Society of Plastics Engineers, 2006, pp. 760-765.
Thyssenkrupp Materials NA, "QC-10 Aluminum Mold Plate", brochure, 4 pages.
Uddeholm, "Moldmax HH", brochure, 8pages, www.uddeholm.com.
United States Patent and Trademark Office, online Trademark Electronic Search System, Moldmax HH, 2 pages, http://tess2.uspto.gov/bin/showfield?f=doc&state=4808:k8agoi.3.8.
United States Patent and Trademark Office, online Trademark Electronic Search System, QC 10, 2 pages, http://tess2.uspto.gov/bin/showfield?f=doc&state=4810:7di60m.2.1.
Wikipedia: "Low Pressure Molding", pp. 1-4, XP002681936, Internet: http://en.wikipedia.org/wiki/Low_pressure_molding.

* cited by examiner

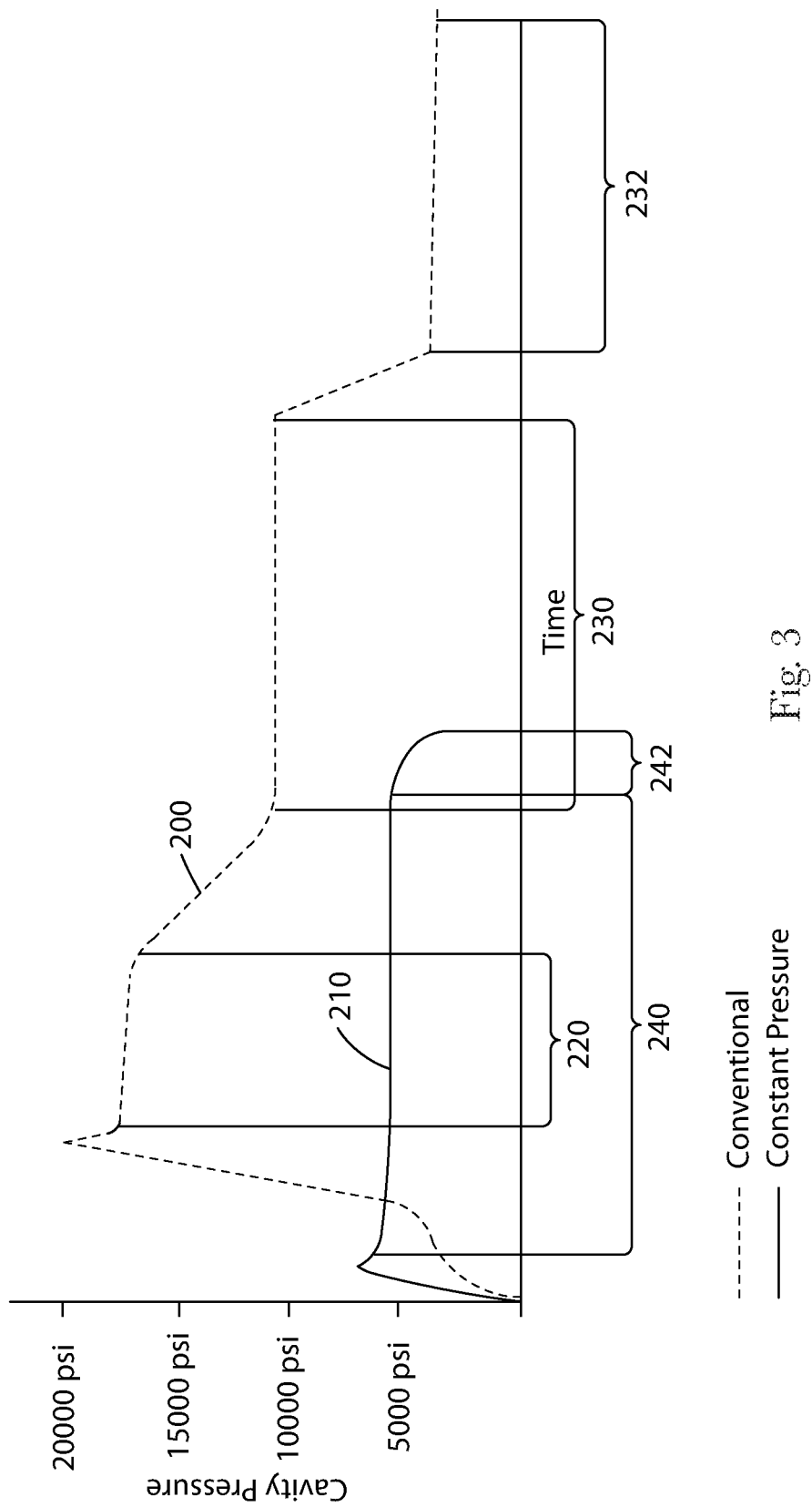

- ■ 35 MFI: PPFF @ 8 in/s Conventional
- △ 35 MFI: PPFF @ 6 in/s Conventional
- ◆ 35 MFI: PPFF New Process
- □ 12 MFI: PPFF @ 8 in/s Conventional
- ▲ 12 MFI: PPFF @ 6 in/s Conventional
- × 12 MFI: PPFF New Process
- ✲ 55 MFI: PPFF @ 8 in/s Conventional
- ● 55 MFI: PPFF @ 6 in/s Conventional
- ○ 55 MFI: PPFF New Process
-     Reference Line
- -------- Linear (Reference Line)

METHOD AND APPARATUS FOR SUBSTANTIALLY CONSTANT PRESSURE INJECTION MOLDING OF THINWALL PARTS

This Application is a divisional of U.S. application Ser. No. 13/476,584, filed on May 21, 2012, which claims the benefit of U.S. Provisional Application Nos. 61/488,547, 61/488,553, 61/488,555, 61/488,559, and 61/488,564, each filed on May 20, 2011; U.S. Provisional Application Nos. 61/602,650 and 61/602,781, each filed on Feb. 24, 2012; and U.S. Provisional Application No. 61/641,349, filed on May 2, 2012, all of which are hereby incorporated by reference in their entirety.

TECHNICAL FIELD

The present invention relates to apparatuses and methods for injection molding and, more particularly, to apparatuses and methods for producing thinwall injection molded parts at a substantially constant injection pressure.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold.

During the injection molding process, the molten plastic resin is injected into the mold cavity and the plastic resin is forcibly injected into the cavity by the injection molding machine until the plastic resin reaches the location in the cavity furthest from the gate. Thereafter, the plastic resin fills the cavity from the end back towards the gate. The resulting length and wall thickness of the part is a result of the shape of the mold cavity.

In some cases, it may be desirous to reduce the wall thickness of injected molded parts to reduce the plastic content, and thus cost, of the final part. Reducing wall thickness using a conventional high variable pressure injection molding process can be an expensive and a non-trivial task. In fact, conventional high variable pressure injection molding machines (e.g. machines injecting molten plastic resin between about 8,000 psi and about 20,000 psi) have a practical limit as to how thin walls of a part may be molded. Generally speaking, conventional high variable pressure injection molding machines cannot mold parts having a thinwall ratio (as defined by an L/T ratio set forth below) of greater than about 200. Furthermore, molding thinwall parts with thinwall ratios of more than 100 requires pressures at the high end of current capability and thus, presses that are capable of handling these high pressures.

When filling a thinwall part, the current industry practice is to fill the mold cavity at the highest possible rate the molding machine can achieve. This approach ensures that the mold cavity is filled before the polymer "freezes off" in the mold, and provides the lowest possible cycle time since the polymer is exposed to the cooled mold cavity as quickly as possible. This approach has two drawbacks. The first is that to achieve very high filling velocities requires very high power loads, and this requires very expensive molding equipment. Further, most electric presses are unable to provide sufficient power to achieve these high filling rates, or require very complicated and expensive drive systems that substantially increase the cost of the molding equipment making them impractical economically.

The second drawback is that the high filling rates result in very high pressures. These high pressures result in the need for very high clamping forces to hold the mold closed during filling, and these high clamping forces result in very expensive molding equipment. The high pressures also require very high strength injection molds, typically made from hardened tool steels. These high strength molds are also very expensive, and can be impractical economically for many molded components. Even with these substantial drawbacks, the need for thinwall injection molded components remains high, since these components use less polymer material to construct the molded part resulting in savings that more than offset the higher equipment costs. Further, some molded components require very thin design elements to perform properly, such as design elements that need to flex, or design elements that must mate with very small features.

As a liquid plastic resin is introduced into an injection mold in a conventional high variable pressure injection molding process the material adjacent to the walls of the cavity, immediately begins to "freeze," or solidify, or cure, and in the case or crystalline polymers the plastic resin begins to crystallize, because the liquid plastic resin cools to a temperature below the material's no flow temperature and portions of the liquid plastic become stationary. This frozen material adjacent to the walls of the mold narrows the flow path the thermoplastic travels as it progresses to the end of the mold cavity. The thickness of the frozen material layer adjacent to the walls of the mold increases as the filling of the mold cavity progresses, this causes a progressive reduction in the cross sectional area the polymer must flow through to continue to fill the mold cavity. As material freezes, it also shrinks, pulling away from the mold cavity walls, which reduces effective cooling of the material by the mold cavity walls. As a result, conventional high variable pressure injection molding machines fill the mold cavity with plastic very quickly and then maintain a packing pressure to force the material outward against the sides of the mold cavity to enhance cooling and to maintain the correct shape of the molded part. Conventional high variable pressure injection molding machines typically have cycle times made up of about 10% injection time, about 50% packing time, and about 40% cooling time.

As plastic freezes in the mold cavity, conventional high variable pressure injection molding machines increase injection pressure (to maintain a substantially constant volumetric flow rate due to the smaller cross-sectional flow area). Increasing the pressure, however, has both cost and performance downsides. As the pressure required to mold the component increases, the molding equipment must be strong enough to withstand the additional pressure, which generally equates to being more expensive. A manufacturer may have to purchase new equipment to accommodate these increased pressures. Thus, a decrease in the wall thickness of a given part can result in significant capital expenses to accomplish the manufacturing via conventional injection molding techniques.

In an effort to avoid some of the drawbacks mentioned above, many conventional injection molding operations use shear-thinning plastic material to improve flow characteristics of the plastic material into the mold cavity. As the shear-thinning plastic material is injected into the mold cavity, shear forces generated between the plastic material and the mold cavity walls tend to reduce viscosity of the plastic material, thereby allowing the plastic material to flow more freely and easily into the mold cavity. As a result, it is possible to fill thinwall parts fast enough to avoid the material completely freezing off before the mold is completely filled.

Reduction in viscosity is directly related to the magnitude of shear forces generated between the plastic material and the feed system, and between the plastic material and the mold cavity wall. Thus, manufacturers of these shear-thinning materials and operators of injection molding systems have been driving injection molding pressures higher in an effort to increase shear, thus reducing viscosity. Typically, high output injection molding systems (e.g., class 101 and 30 systems) inject the plastic material in to the mold cavity at melt pressures of typically 15,000 psi or more. Manufacturers of shear-thinning plastic material teach injection molding operators to inject the plastic material into the mold cavities above a minimum melt pressure. For example, polypropylene resin is typically processed at pressures greater than 6,000 psi (the recommended range from the polypropylene resin manufacturers, is typically from greater than 6,000 psi to about 15,000 psi). Press manufacturers and processing engineers typically recommend processing shear thinning polymers at the top end of the range, or significantly higher, to achieve maximum potential shear thinning, which is typically greater than 15,000 psi, to extract maximum thinning and better flow properties from the plastic material. Shear thinning thermoplastic polymers generally are processed in the range of over 6,000 psi to about 30,000 psi. Even with the use of shear thinning plastics, a practical limit exists for high variable pressure injection molding of thin walled parts. This limit is currently in the range of thinwall parts having a thinwall ratio of 200 or more. Moreover, even parts having a thinwall ratio of between 100 and 200 may become cost prohibitive as these parts generally require injection pressures between about 15,000 psi and about 20,000 psi.

High production injection molding machines (i.e., class 101 and class 30 molding machines) that produce thinwalled consumer products exclusively use molds having a majority of the mold made from high hardness materials. High production injection molding machines typically produce 500,000 cycles per year or more. Industrial quality production molds must be designed to withstand at least 500,000 cycles per year, preferably more than 1,000,000 cycles per year, more preferably more than 5,000,000 cycles per year, and even more preferably more than 10,000,000 cycles per year. These machines have multi cavity molds and complex cooling systems to increase production rates. The high hardness materials are more capable of withstanding the repeated high pressure clamping operations than lower hardness materials. However, high hardness materials, such as most tool steels, have relatively low thermal conductivities, generally less than 20 BTU/HR FT ° F., which leads to long cooling times as heat is transferred through from the molten plastic material through the high hardness material.

Even with the ever increasing injection pressure ranges of existing high variable pressure injection molding machines, a practical limit remains of about 200 (L/T ratio) for molding thinwalled parts in conventional high (e.g., 20,000 psi) variable pressure injection molding machines and thinwall parts having a thinwall ratio of between about 100 and about 200 may be cost prohibitive for many manufacturers.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 is a cavity pressure vs. time graph for the substantially constant pressure injection molding machine of FIG. 1 superimposed over a cavity pressure vs. time graph for a conventional high variable pressure injection molding machine;

DETAILED DESCRIPTION

Figure 1:
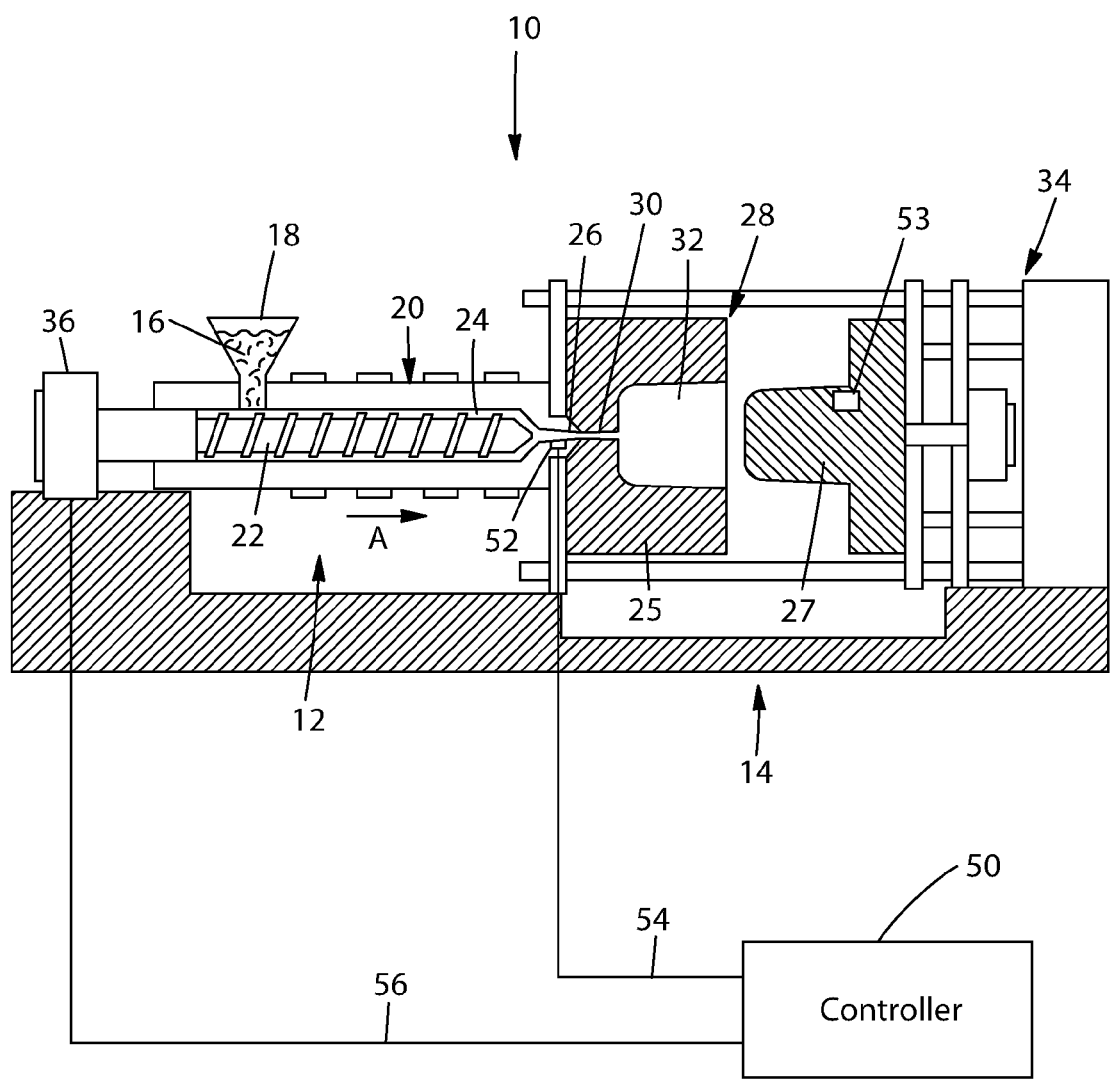
FIG. 1 illustrates a schematic view of a substantially constant pressure injection molding machine constructed according to the disclosure.

Embodiments of the present invention generally relate to systems, machines, products, and methods of producing products by injection molding and more specifically to systems, products, and methods of producing products by substantially constant pressure injection molding.

The term "low pressure" as used herein with respect to melt pressure of a thermoplastic material, means melt pressures in a vicinity of a nozzle of an injection molding machine of 6000 psi and lower.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure' includes, but is not limited to, pressure variations for which viscosity of the melted thermoplastic material do not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

The term "Melt holder", as used herein, refers to the portion of an injection molding machine that contains molten plastic in fluid communication with the machine nozzle. The melt holder is heated, such that a polymer may be prepared and held at a desired temperature. The melt holder is connected to a power source, for example a hydraulic cylinder or electric servo motor, that is in communication with a central control unit, and can be controlled to advance a diaphragm to force molten plastic through the machine nozzle. The molten material then flows through the runner system in to the mold cavity. The melt holder may by cylindrical in cross section, or have alternative cross sections that will permit a diaphragm to force polymer under pressures that can range from as low as 100 psi to pressures 40,000 psi or higher through the machine nozzle. The diaphragm may optionally be integrally connected to a reciprocating screw with flights designed to plasticize polymer material prior to injection.

The term "high L/T ratio" generally refers to L/T ratios of 100 or greater, and more specifically to L/T ratios of 200 or greater. Calculation of the L/T ratio is defined below.

The term "peak flow rate" generally refers to the maximum volumetric flow rate, as measured at the machine nozzle.

The term "peak injection rate" generally refers to the maximum linear speed the injection ram travels in the process of forcing polymer in to the feed system. The ram can be a reciprocating screw such as in the case of a single stage injection system, or a hydraulic ram such as in the case of a two stage injection system.

The term "ram rate" generally refers to the linear speed the injection ram travels in the process of forcing polymer in to the feed system.

The term "flow rate" generally refers to the volumetric flow rate of polymer as measured at the machine nozzle. This flow rate can be calculated based on the ram rate and ram cross sectional area, or measured with a suitable sensor located in the machine nozzle.

The term "cavity percent fill" generally refers to the percentage of the cavity that is filled on a volumetric basis. For example, if a cavity is 95% filled, then the total volume of the mold cavity that is filled is 95% of the total volumetric capacity of the mold cavity.

The term "melt temperature" generally refers to the temperature of the polymer that is maintained in the melt holder, and in the material feed system when a hot runner system is used, which keeps the polymer in a molten state. The melt temperature varies by material, however, a desired melt temperature is generally understood to fall within the ranges recommended by the material manufacturer.

The term "gate size" generally refers to the cross sectional area of a gate, which is formed by the intersection of the runner and the mold cavity. For hot runner systems, the gate can be of an open design where there is no positive shut off of the flow of material at the gate, or a closed design where a valve pin is used to mechanically shut off the flow of material through the gate in to the mold cavity (commonly referred to as a valve gate). The gate size refers to the cross sectional area, for example a 1 mm gate diameter refers to a cross sectional area of the gate is 1 mm at the point the gate meets the mold cavity. The cross section of the gate may be of any desired shape.

The term "intensification ratio" generally refers to the mechanical advantage the injection power source has on the injection ram forcing the molten polymer through the machine nozzle. For hydraulic power sources, it is common that the hydraulic piston will have a 10:1 mechanical advantage over the injection ram. However, the mechanical advantage can range from ratios much lower, such as 2:1, to much higher mechanical advantage ratio such as 50:1.

The term "peak power" generally refers to the maximum power generated when filling a mold cavity. The peak power may occur at any point in the filling cycle. The peak power is determined by the product of the plastic pressure as measured at the machine nozzle multiplied by the flow rate as measured at the machine nozzle. Power is calculated by the formula $P=p*Q$ where p is pressure and Q is volumetric flow rate.

The term "volumetric flow rate" generally refers to the flow rate as measured at the machine nozzle. This flow rate can be calculated based on the ram rate and ram cross sectional area, or measured with a suitable sensor located in the machine nozzle.

The terms "filled" and "full," when used with respect to a mold cavity including thermoplastic material, are interchangeable and both terms mean that thermoplastic material has stopped flowing into the mold cavity.

The term "shot size" generally refers to the volume of polymer to be injected from the melt holder to completely fill the mold cavity or cavities. The Shot Size volume is determined based on the temperature and pressure of the polymer in the melt holder just prior to injection. In other words, the shot size is a total volume of molten plastic material that is injected in a stroke of an injection molding ram at a given temperature and pressure. Shot size may include injecting molten plastic material into one or more injection cavities through one or more gates. The shot of molten plastic material may also be prepared and injected by one or more melt holders.

The term "hesitation" generally refers to the point at which the velocity of the flow front is minimized sufficiently to allow a portion of the polymer to drop below its no flow temperature and begin to freeze off.

The term "electric motor" or "electric press," when used herein includes both electric servo motors and electric linear motors.

The term "Peak Power Flow Factor" refers to a normalized measure of peak power required by an injection molding system during a single injection molding cycle and the Peak Power Flow Factor may be used to directly compare power requirements of different injection molding systems. The Peak Power Flow Factor is calculated by first determining the Peak Power, which corresponds to the maximum product of molding pressure multiplied by flow rate during the filling cycle (as defined herein), and then determining the Shot Size for the mold cavities to be filled. The Peak Power Flow Factor is then calculated by dividing the Peak Power by the Shot Size.

The tem "cavity percent fill" is defined as the % of the cavity that is filled on a volumetric basis. Thus, if a cavity is 95% filled, then the total volume of the mold cavity that is filled is 95% of the total volumetric capacity of the mold cavity.

Referring to the figures in detail, FIG. 1 illustrates an exemplary substantially constant pressure injection molding apparatus 10 for producing thinwalled parts in high volumes (e.g., a class 101 or 30 injection mold, or an "ultra high productivity mold"), especially thinwalled parts having an L/T ratio of 100 or greater. The substantially constant pressure injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a sensor 52, located in the vicinity of the nozzle 26, and a screw control 36. The controller 50 may include a microprocessor, a memory, and one or more communication links. The controller 50 may also be optionally connected to a sensor 53 located proximate an end of the mold cavity 32. This sensor 32 may provide an indication of when the thermoplastic material is approaching the end of fill in the mold cavity 32. The sensor 32 may sense the presence of thermoplastic material by optically, pneumatically, mechanically or otherwise sensing pressure and/or temperature of the thermoplastic material. When pressure or temperature of the thermoplastic material is measured by the sensor 52, this sensor 52 may send a signal indicative of the pressure or the temperature to the controller 50 to provide a target pressure for the controller 50 to maintain in the mold cavity 32 (or in the nozzle 26) as the fill is completed. This signal may generally be used to control the molding process, such that variations in material viscosity, mold temperatures, melt temperatures, and other variations influencing filling rate, are adjusted by the controller 50. These adjustments may be made immediately during the molding cycle, or corrections can be made in subsequent cycles. Furthermore, several signals may be averaged over a number of cycles and then used to make adjustments to the molding process by the controller 50. The controller 50 may be connected to the sensor 52, and/or the sensor 53, and the screw control 36 via wired connections 54, 56, respectively. In other embodiments, the controller 50 may be connected to the sensors 52, 53 and screw control 56 via a wireless connection, a mechanical connection, a hydraulic connection, a pneumatic connection, or any other type of communication connection known to those having ordinary skill in the art that will allow the controller 50 to communicate with both the sensors 52, 53 and the screw control 36.

In the embodiment of FIG. 1, the sensor 52 is a pressure sensor that measures (directly or indirectly) melt pressure of the molten thermoplastic material 24 in vicinity of the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate an estimate of the melt pressure in the nozzle 26. The sensor 52 need not be in direct contact with the injected fluid and may alternatively be in dynamic communication with the fluid and able to sense the pressure of the fluid and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location which is fluidly connected with the nozzle. Rather, the sensor could measure clamping force generated by the clamping system 14 at a mold parting line between the first and second mold parts 25, 27. In one aspect the controller 50 may maintain the pressure according to the input from sensor 52. Alternatively, the sensor could measure an electrical power demand by an electric press, which may be used to calculate an estimate of the pressure in the nozzle.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

Figure 2:
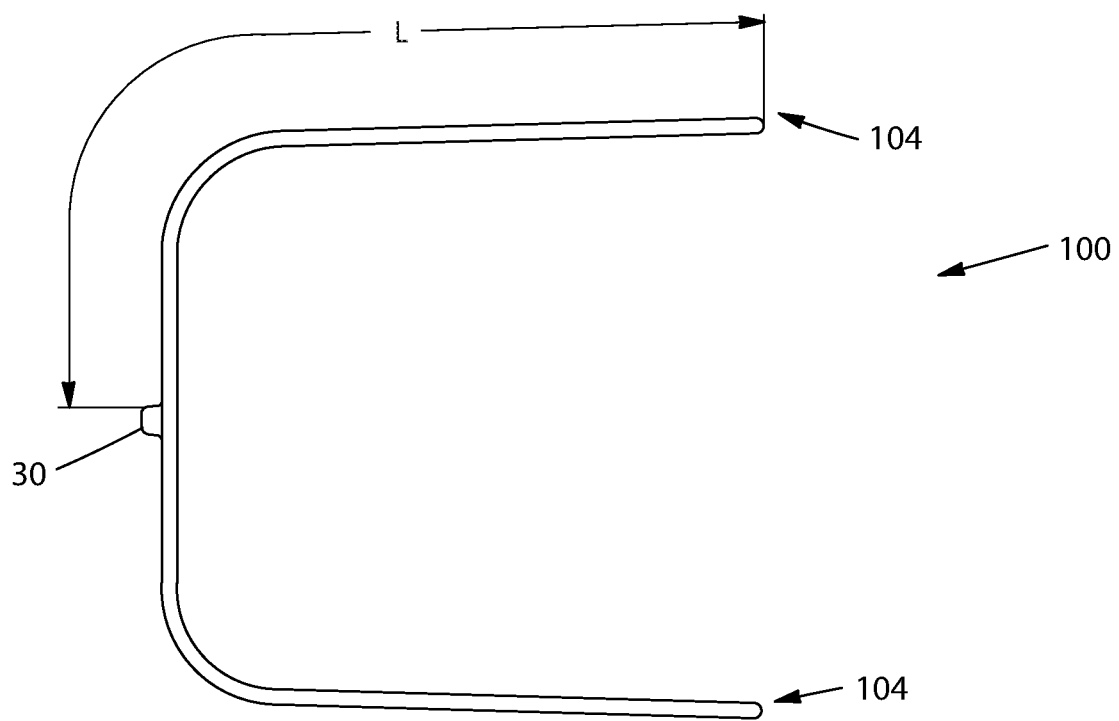
FIG. 2 illustrates one embodiment of a thin-walled part formed in the substantially constant pressure injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100). For mold cavities having a more complicated geometry, the L/T ratio may be calculated by integrating the T dimension over the length of the mold cavity 32 from a gate 30 to the end of the mold cavity 32, and determining the longest length of flow from the gate 30 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates. In some injection molding industries, thin-walled parts may be defined as parts having an L/T>100, or having an L/T>200. The length of the flow channel L is the longest flow length as measured from the gate 30 to the end 104 of the mold cavity. Thin-walled parts are especially prevalent in the consumer products industry.

High L/T ratio parts are commonly found in molded parts having average thicknesses less than about 10 mm. In consumer products, products having high L/T ratios generally have an average thickness of less than about 5 mm. For example, while automotive bumper panels having a high L/T ratio generally have an average thickness of 10 mm or less, tall drinking glasses having a high L/T ratio generally have an average thickness of about 5 mm or less, containers (such as tubs or vials) having a high L/T ratio generally have an average thickness of about 3 mm or less, bottle cap enclosures having a high L/T ratio generally have an average thickness of about 2 mm or less, and individual toothbrush bristles having a high L/T ratio generally have an average thickness of about 1 mm or less. The substantially constant pressure processes and devices disclosed herein are particularly advantageous for parts having a thickness of 5 mm or less and the disclosed processes and devices are more advantageous for thinner parts.

Thin-walled parts with high L/T ratios present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject at high pressures is the increased shear, which increases flow characteristics, as discussed above. These very high injection pressures require the use of very hard materials to form the mold 28 and the feed system, among other things.

When filling at constant pressure, it was generally thought that the filling rates would need to be reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. It has been unexpectedly discovered that the thermoplastic material will flow when subjected to substantially constant pressure conditions despite a portion of the mold cavity being below the no-flow temperature of the thermoplastic material. It would be generally expected by one of ordinary skill in the art that such conditions would cause the thermoplastic material to freeze and plug the mold cavity rather than continue to flow and fill the entire mold cavity. Without intending to be bound by theory, it is believed that the substantially constant pressure conditions of embodiments of the disclosed method and device allow for dynamic flow conditions (i.e., constantly moving melt front) throughout the entire mold cavity during filling. There is no hesitation in the flow of the molten thermoplastic material as it flows to fill the mold cavity and, thus, no opportunity for freeze-off of the flow despite at least a portion of the mold cavity being below the no-flow temperature of the thermoplastic material.

Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

The disclosed substantially constant pressure injection molding methods and systems may use a sensor (such as the sensor 53 in FIG. 1 above) located near an end of flow position (i.e., near an end of the mold cavity) to monitor changes in material viscosity, changes in material temperature, and changes in other material properties. Measurements from this sensor may be communicated to the controller to allow the controller to correct the process in real time to ensure the melt front pressure is relieved prior to the melt front reaching the end of the mold cavity, which can cause flashing of the mold, and another pressure and power peak. Moreover, the controller may use the sensor measurements to adjust the peak power and peak flow rate points in the process, so as to achieve consistent processing conditions. In addition to using the sensor measurements to fine tune the process in real time during the current injection cycle, the controller may also to adjust the process over time (e.g., over a plurality of injection cycles). In this way, the current injection cycle can be corrected based on measurements occurring during one or more cycles at an earlier point in time. In one embodiment, sensor readings can be averaged over many cycles so as to achieve process consistency.

In various embodiments, the mold can include a cooling system that maintains the entire mold cavity at a temperature below the no-flow temperature. For example, even surfaces of the mold cavity which contact the shot comprising molten thermoplastic material can be cooled to maintain a lower temperature. Any suitable cooling temperature can be used. For example, the mold can be maintained substantially at room temperature. Incorporation of such cooling systems can advantageously enhance the rate at which the as-formed injection molded part is cooled and ready for ejection from the mold.

Thermoplastic Material:

A variety of thermoplastic materials can be used in the substantially constant pressure injection molding methods and devices of the disclosure. In one embodiment, the molten thermoplastic material has a viscosity, as defined by the melt flow index of about 0.1 g/10 min to about 500 g/10 min, as measured by ASTM D1238 performed at temperature of about 230 C with a 2.16 kg weight. For example, for polypropylene the melt flow index can be in a range of about 0.5 g/10 min to about 200 g/10 min. Other suitable melt flow indexes include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material is selected based on the application and use of the molded article. For examples, thermoplastic materials with an MFI of 0.1 g/10 min to about 5 g/10 min may be suitable for use as preforms for Injection Stretch Blow Molding (ISBM) applications. Thermoplastic materials with an MFI of 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using melt pressures in excess of 6000 psi, and often in great excess of 6000 psi. Contrary to conventional teachings regarding injection molding of such thermoplastic materials, embodiments of the constant injection molding method and device of the disclosure advantageously allow for forming quality injection molded parts using such thermoplastic materials and processing at melt pressures below 6000 psi, and possibly well below 6000 psi.

The thermoplastic material can be, for example, a polyolefin. Exemplary polyolefins include, but are not limited to, polypropylene, polyethylene, polymethylpentene, and polybutene-1. Any of the aforementioned polyolefins could be sourced from bio-based feedstocks, such as sugarcane or other agricultural products, to produce a bio-polypropylene or bio-polyethylene. Polyolefins advantageously demonstrate shear thinning when in a molten state. Shear thinning is a reduction in viscosity when the fluid is placed under compressive stress. Shear thinning can beneficially allow for the flow of the thermoplastic material to be maintained throughout the injection molding process. Without intending to be bound by theory, it is believed that the shear thinning properties of a thermoplastic material, and in particular polyolefins, results in less variation of the materials viscosity when the material is processed at constant pressures. As a result, embodiments of the method and device of the disclosure can be less sensitive to variations in the thermoplastic material, for example, resulting from colorants and other additives as well as processing conditions. This decreased sensitivity to batch-to-batch variations of the properties thermoplastic material can also advantageously allow post-industrial and post consumer recycled plastics to be processed using embodiments of the method and the device of the disclosure. Post-industrial, post consumer recycled plastics are derived from end products that have completed their life cycle as a consumer item and would otherwise have been disposed of as a solid waste product. Such recycled plastic, and blends of thermoplastic materials, inherently have significant batch-to-batch variation of their material properties.

The thermoplastic material can also be, for example, a polyester. Exemplary polyesters include, but are not limited to, polyethylene teraphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials that material may be biodegradable.

Exemplary thermoplastic resins together with their recommended operating pressure ranges are provided in the following table:

| Material | Full Name | Injection Pressure Range (PSI) | Company | Material Brand Name |
|---|---|---|---|---|
| pp | Polypropylene | 10000-15000 | RTP Imagineering Plastics | RTP 100 series Polypropylene |
| Nylon | | 10000-18000 | RTP Imagineering Plastics | RTP 200 series Nylon |
| ABS | Acrylonitrile Butadiene Styrene | 8000-20000 | Marplex | Astalac ABS |
| PET | Polyester | 5800-14500 | Asia International | AIE PET 401F |
| Acetal Copolymer | | 7000-17000 | API Kolon | Kocetal |
| PC | Polycarbonate | 10000-15000 | RTP Imagineering Plastics | RTP 300 series Polycarbonate |
| PS | Polystyrene | 10000-15000 | RTP Imagineering Plastics | RTP 400 series |
| SAN | Styrene Acrylonitrile | 10000-15000 | RTP Imagineering Plastics | RTP 500 series |
| PE | LDPE & HDPE | 10000-15000 | RTP Imagineering Plastics | RTP 700 Series |
| TPE | Thermoplastic Elastomer | 10000-15000 | RTP Imagineering Plastics | RTP 1500 series |
| PVDF | Polyvinylidene Fluoride | 10000-15000 | RTP Imagineering Plastics | RTP 3300 series |
| PTI | Polytrimethylene Terephthalate | 10000-15000 | RTP Imagineering Plastics | RTP 4700 series |
| PBT | Polybutylene Terephthalate | 10000-15000 | RTP Imagineering Plastics | RTP 1000 series |
| PLA | Polylactic Acid | 8000-15000 | RTP Imagineering Plastics | RTP 2099 series |

While more than one of the embodiments involves filling substantially the entire mold cavity with the shot comprising the molten thermoplastic material while maintaining the melt pressure of the shot comprising the molten thermoplastic material at a substantially constant pressure, specific thermoplastic materials benefit from the invention at different constant pressures. Specifically: PP, nylon, PC, PS, SAN, PE, TPE, PVDF, PTI, PBT, and PLA at a substantially constant pressure of less than 10000 psi; ABS at a substantially constant pressure of less than 8000 psi; PET at a substantially constant pressure of less than 5800 psi; Acetal copolymer at a substantially constant pressure of less than 7000 psi; plus poly(ethylene furanate) polyhydroxyalkanoate, polyethylene furanoate (aka PEF) at substantially constant pressure of less than 10000 psi, or 8000 psi, or 7000 psi or 6000 psi, or 5800 psi.

As described in detail above, embodiments of the disclosed substantially constant pressure method and device can achieve one or more advantages over conventional high variable pressure injection molding processes. For example, embodiments include a more cost effective and efficient process that eliminates the need to balance the pre-injection pressures of the mold cavity and the thermoplastic materials, a process that allows for use of atmospheric mold cavity pressures and, thus, simplified mold structures that eliminate the necessity of pressurizing means, the ability to use lower hardness, high thermal conductivity mold cavity materials that are more cost effective and easier to machine, a more robust processing method that is less sensitive to variations in the temperature, viscosity, and other material properties of the thermoplastic material, and the ability to produce quality injection molded parts at substantially constant pressures without premature hardening of the thermoplastic material in the mold cavity and without the need to heat or maintain constant temperatures in the mold cavity.

In one example, sample parts were molded using a substantially constant pressure process below 6000 PSI of injection pressure.

Samples were isolated from the injection molded parts using a common laboratory microtome. At least four samples were taken from each injection molded part. The cross section of the samples were then prepared to expose the compositional layers (skin, core, etc.) of each sample.

Synchrotron measurements were taken at Deutsches Elektronen Synchrotron (DESY) beamline G3 at DORIS III with the MAXIM detector ensemble, i.e. first measurements were taken by the point averaging scintillation counting device to obtain overviews of sample diffraction. Spatially resolved diffraction images were then taken by the position sensitive camera of MAXIM (a 2D detector Hamamatsu 4880 with multichannel plate [MCP] in front of its CCD sensor).

Synchrotron measurements revealed that injection molded parts having a certain thickness, that were molded using a substantially constant pressure process show a distinct and discernible extra band or zone of oriented polypropylene crystallites in the core of the part. This extra zone of oriented material can be seen in parts molded using either steel or aluminum molds. Parts molded using a conventional, higher variable pressure process usually have a reduced number of oriented bands when compared to a part molded using a substantially constant pressure process.

Parts molded using a substantially constant pressure process may have less molded-in stress. In a conventional high variable pressure process, the velocity-controlled filling process combined with a higher transfer or switchover to pressure control may result in a part with high levels of undesirable molded-in stress. If the pack pressure is set too high in a conventional process, the part will often have an over-packed gate region. The molded-in stress can be visually assessed by placing the parts on a cross-polarized light table. The birefringence observed in molded parts can be used to observe differences in molded-in stress. Typically this is observed as patterns of stress lines in the part. The greater the number of lines and/or the non-uniformity of the stress lines is typically undesirable.

Turning now to FIG. 3, a typical pressure-time curve for a conventional high variable pressure injection molding process is illustrated by the dashed line 200. By contrast, a pressure-time curve for the disclosed constant pressure injection molding machine is illustrated by the solid line 210.

In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower, but still relatively high pressure, typically 10,000 psi or more, for a second period of time 230. The second period of time 230 is a packing time in which the melt pressure is maintained to ensure that all gaps in the mold cavity are back filled. After packing is complete, the pressure may optionally be dropped again for a third period of time 232, which is the cooling time. The mold cavity in a conventional high pressure injection molding system is packed from the end of the flow channel back to towards the gate. The material in the mold typically freezes off near the end of the cavity, then completely frozen off region of material progressively moves toward the gate location, or locations. As a result, the plastic near the end of the mold cavity is packed for a shorter time period and with reduced pressure, than the plastic material that is closer to the gate location, or locations. Part geometry, such as very thin cross sectional areas midway between the gate and end of mold cavity, can also influence the level of packing pressure in regions of the mold cavity. Inconsistent packing pressure may cause inconsistencies in the finished product, as discussed above. Moreover, the conventional packing of plastic in various stages of solidification results in some non-ideal material properties, for example, molded-in stresses, sink, and non-optimal optical properties.

The substantially constant pressure injection molding system, on the other hand, injects the molten plastic material into the mold cavity at a substantially constant pressure for a fill time period 240. The injection pressure in the example of FIG. 3 is less than 6,000 psi. However, other embodiments may use higher pressures as long as the pressure is substantially constant during the molding process. After the mold cavity is filled, the substantially constant pressure injection molding system gradually reduces pressure over a second time period 242 as the molded part is cooled. By using a substantially constant pressure, the molten thermoplastic material maintains a continuous melt flow front that advances through the flow channel from the gate towards the end of the flow channel. In other words, the molten thermoplastic material remains moving throughout the mold cavity, which prevents premature freeze off. Thus, the plastic material remains relatively uniform at any point along the flow channel, which results in a more uniform and consistent finished product. By filling the mold with a relatively uniform pressure, the finished molded parts form crystalline structures that may have better mechanical and optical properties than conventionally molded parts. Moreover, the parts molded at constant pressures exhibit different characteristics than skin layers of conventionally molded parts. As a result, parts molded under constant pressure may have better optical properties than parts of conventionally molded parts.

Figure 4A:
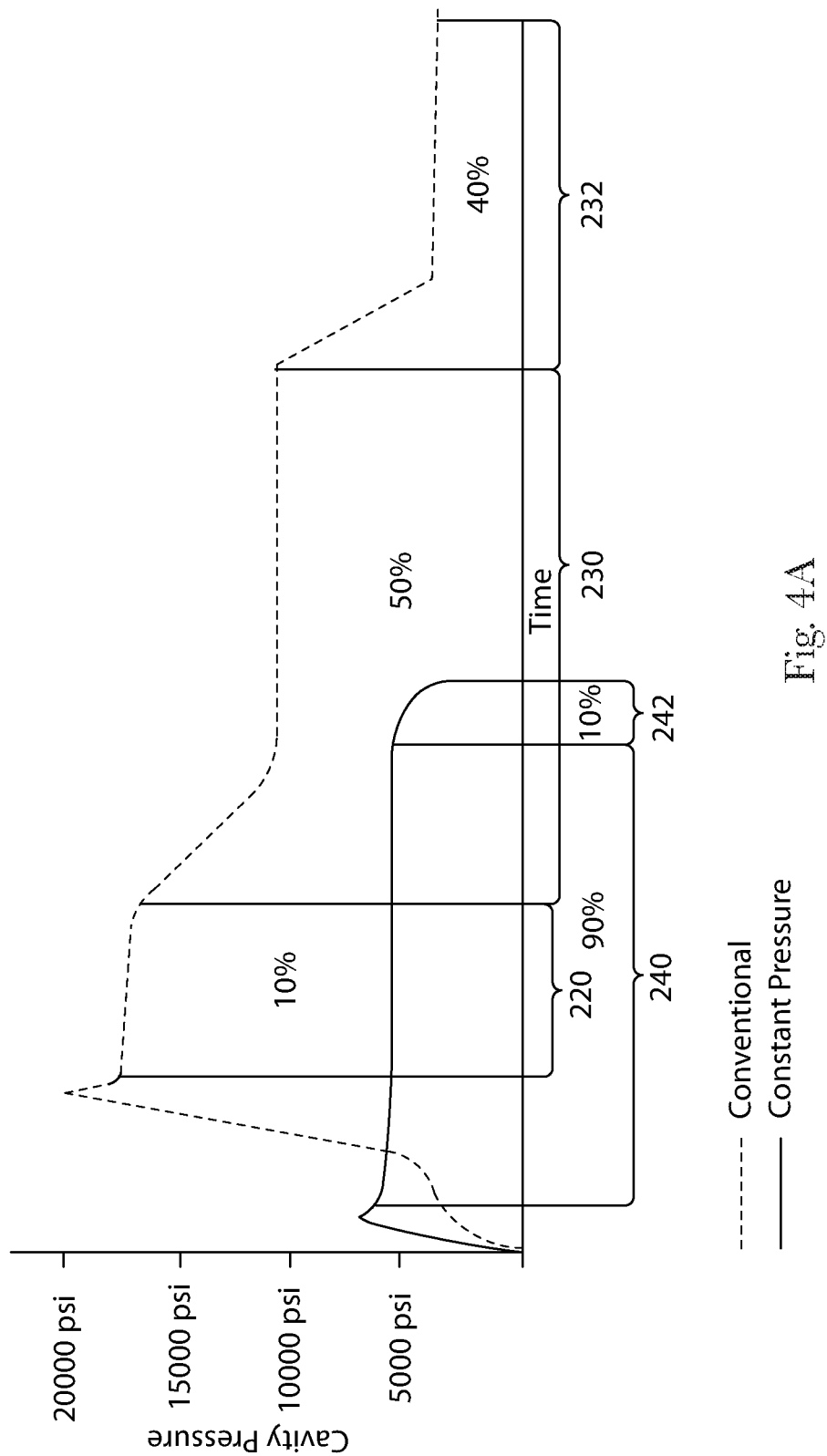
FIG. 4A is another cavity pressure vs. time graph for the substantially constant pressure injection molding machine of FIG. 1 superimposed over a cavity pressure vs. time graph for a conventional high variable pressure injection molding machine, the graphs illustrating the percentage of fill time devoted to certain fill steps.

Turning now to FIG. 4A, the various stages of fill are broken down as percentages of overall fill time. For example, in an conventional high variable pressure injection molding process, the fill period 220 makes up about 10% of the total fill time, the packing period 230 makes up about 50% of the total fill time, and the cooing period 232 makes up about 40% of the total fill time. On the other hand, in the substantially constant pressure injection molding process, the fill period 240 makes up about 90% of the total fill time while the cooling period 242 makes up only about 10% of the total fill time. The substantially constant pressure injection molding process needs less cooling time because the molten plastic material is cooling as it is flowing into the mold cavity. Thus, by the time the mold cavity is filled, the molten plastic material has cooled significantly, although not quite enough to freeze off in the center cross section of the mold cavity, and there is less total heat to remove to complete the freezing process. Additionally, because the molten plastic material remains liquid throughout the fill, and packing pressure is transferred through this molten center cross section, the molten plastic material remains in contact with the mold cavity walls (as opposed to freezing off and shrinking away). As a result, the substantially constant pressure injection molding process described herein is capable of filling and cooling a molded part in less total time than in a conventional high variable pressure injection molding process.

Figure 4B:
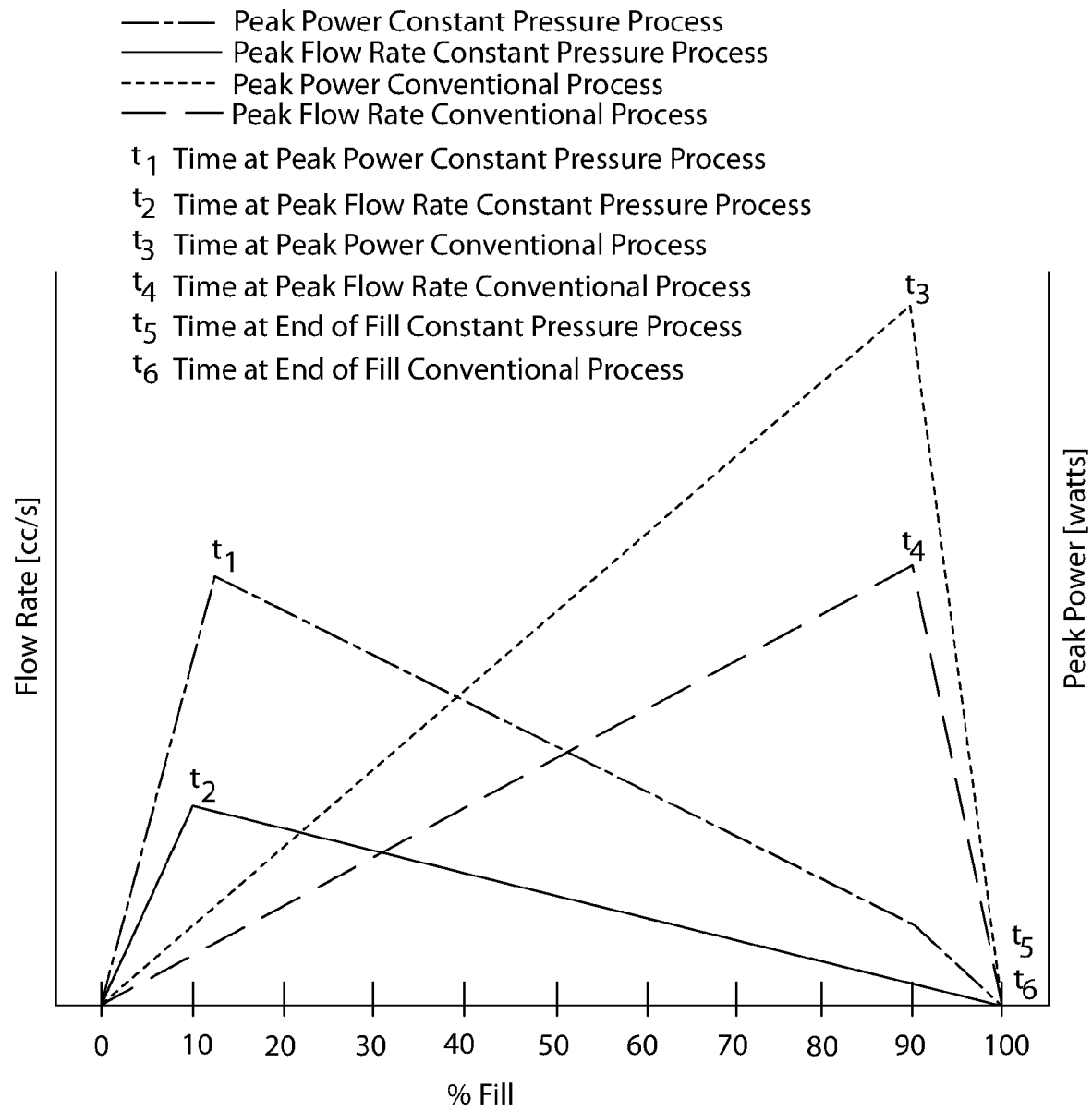
FIG. 4B is a chart illustrating peak power and peak flow rate vs. percentage of mold cavity fill.

Peak power and peak flow rate vs. percentage of mold cavity fill are illustrated in the chart of FIG. 4B for both conventional high variable pressure processes and for substantially constant pressure processes.

In the substantially constant pressure process, the peak power load occurs at a time approximately equal to the time the peak flow rate occurs, then declines steadily through the filling cycle. More specifically, the peak power and the peak flow rate occur in the first 30% of fill, and preferably in the first 20% of fill, and even more preferably in the first 10% of fill. By arranging the peak power and peak flow rate to occur during the beginning of fill, the thermoplastic material is not subject to the extreme conditions when it is closer to freezing. It is believed that this results in superior physical properties of the molded parts.

The power level generally declines slowly through the filling cycle following the peak power load. Additionally, the flow rate generally declines slowly through the filling cycle following the peak flow rate because the fill pressure is maintained substantially constant. As illustrated above, the peak power level is lower than the peak power level for a conventional process, generally 30-50% lower and the peak flow rate is lower than the peak flow rate for a conventional process, generally 30-50% lower.

Similarly, the peak power load for a conventional high variable pressure process occurs at a time approximately equal to the time the peak flow rate occurs. However, unlike the substantially constant process, the peak power and flow rate for the conventional high variable pressure process occur in the final 10%-30% of fill, which subjects the thermoplastic material to extreme conditions as it is in the process of freezing. Also unlike the substantially constant pressure process, the power level in the conventional high variable pressure process generally declines rapidly through the filling cycle following the peak power load. Similarly, the flow rate in a conventional high variable pressure process generally declines rapidly through the filling cycle following the peak flow rate.

In the disclosed method and device for molding a high L/T part, the part is molded by injecting a molten thermoplastic polymer into a mold cavity at an increasing flow rate to achieve a desired injection pressure and then decreasing the flow rate over time to maintain a substantially constant injection pressure. The substantially constant injection pressure method and device are particularly advantageous when molding thinwall parts (e.g., parts having an L/T ratio>100) and when using large shot sizes (e.g., more than 50 cc, and in particular more than 100 cc). It is especially advantageous that the maximum flow rate occur within the first 30% of cavity fill, preferably within the first 20% of cavity fill, and even more preferably within the first 10% of cavity fill. By adjusting the filling pressure profile the maximum flow rate occurs within these preferred ranges of cavity fill, the molded part will have at least some of the physical advantages described above (e.g., better strength, better optical properties, etc.) because the crystalline structure of the molded part is different from a conventionally molded part. Moreover, because high L/T products are thinner, these products require less pigment to impart a desired color to the resulting product. Furthermore, in no-pigment parts, the parts will have less visible deformities due to the more consistent molding conditions. Using less or no pigment saves costs.

Alternatively, the peak power may be adjusted to maintain a substantially constant injection pressure. More specifically, the filling pressure profile may be adjusted to cause the peak power to occur in the first 30% of the cavity fill, preferably in the first 20% of the cavity fill, and even more preferably in the first 10% of the cavity fill. Adjusting the process to cause the peak power to occur within the preferred ranges, and then to have a decreasing power throughout the remainder of the cavity fill results in the same benefits for the molded part that were described above with respect to adjusting peak flow rate. Moreover, adjusting the process in the manner described above is particularly advantageous for thinwall parts (e.g., L/T ratio>100) and for large shot sizes (e.g., more than 50 cc, in particular more than 100 cc).

Figure 4C:
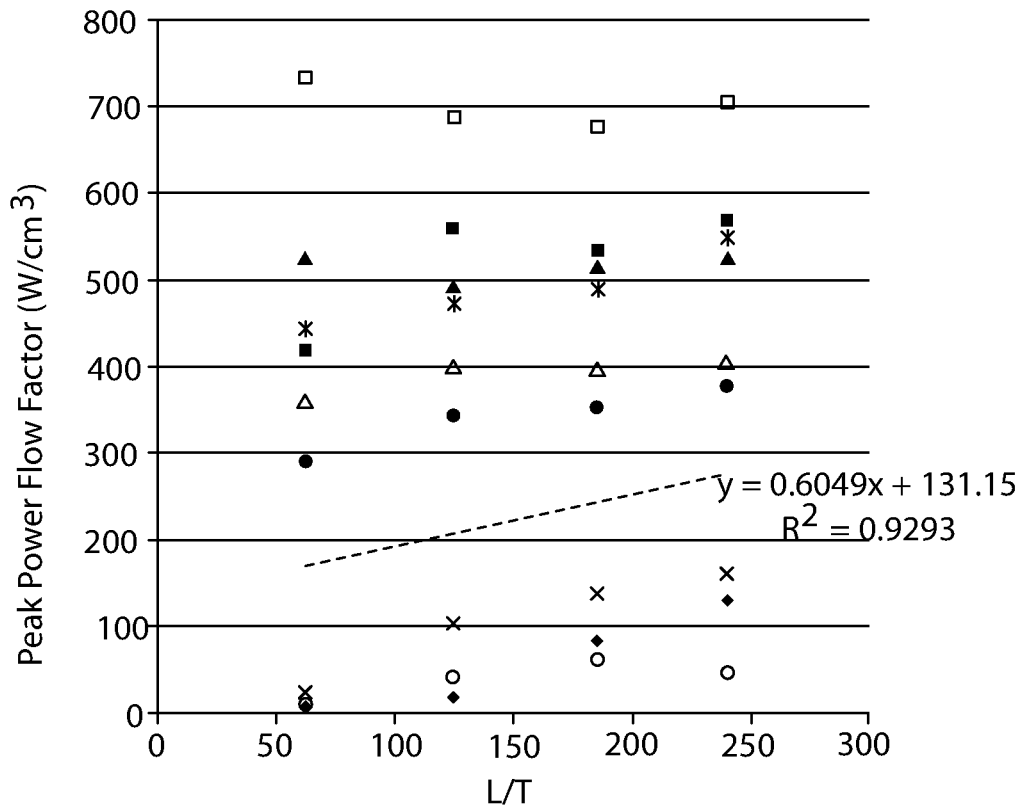
FIG. 4C is a chart illustrating that the substantially constant injection pressure methods and devices disclosed herein also require less power for given L/T ratios than conventional high variable pressure injection molding systems.

The substantially constant injection pressure methods and devices disclosed herein also require less power for given L/T ratios than conventional high variable pressure injection molding systems, as illustrated in the chart of FIG. 4C.

As illustrated above (by the dashed line), the disclosed substantially constant injection pressure methods and devices disclosed herein require less power (i.e., have a lower peak power flow factor) to fill a given mold cavity than conventional high variable pressure injection molding processes for any L/T ratio between 100 and 250, and this relationship extends to L/T of 300, and 400 L/T and greater. In fact, the disclosed substantially constant injection pressure methods and devices require power less than that calculated by the formula:

$$Y=0.7218x+129.74$$

Where Y=peak power flow factor; and

X-L/T ratio

In all cases, conventional high variable pressure injection molding systems require more power than that calculated by the formula above.

Turning now to FIGS. 5A-5D and FIGS. 6A-6D a portion of a mold cavity as it is being filled by a conventional high variable pressure injection molding machine (FIGS. 5A-5D) and as it is being filled by a substantially constant pressure injection molding machine (FIGS. 5A-5D) is illustrated.

Figure 5A:
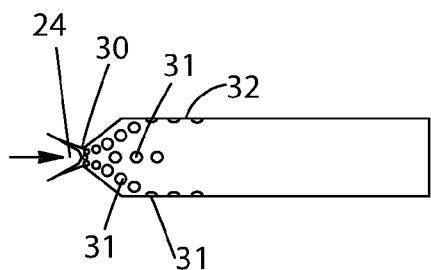
FIGS. 5A-5D are side cross-sectional views of a portion of a thinwall mold cavity in various stages of fill by a conventional high variable pressure injection molding machine.
Figure 5B:
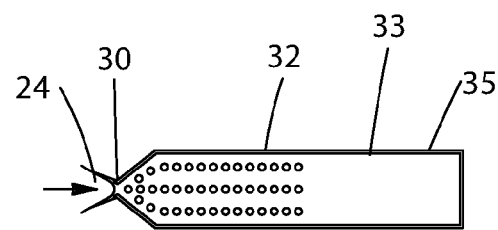
Figure 5C:
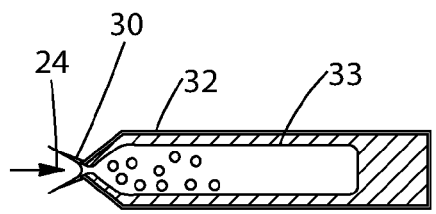
Figure 5D:
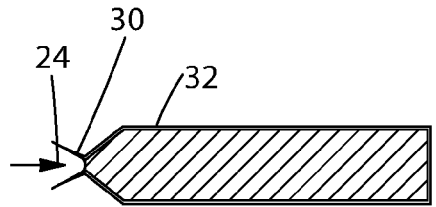
Figure 6A:
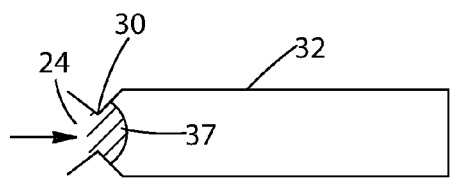
FIGS. 6A-6D are side cross-sectional views of a portion of a thinwall mold cavity in various stages of fill by the substantially constant pressure injection molding machine of FIG. 1.
Figure 6B:
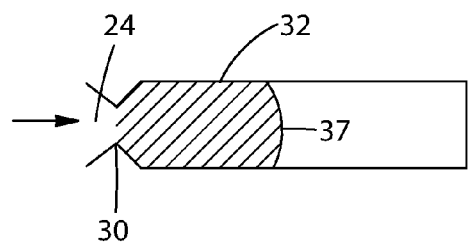
Figure 6C:
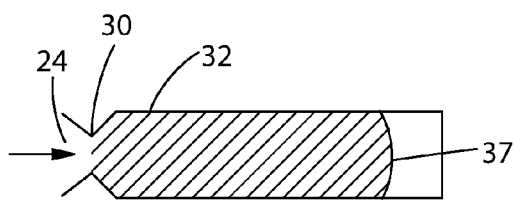
Figure 6D:
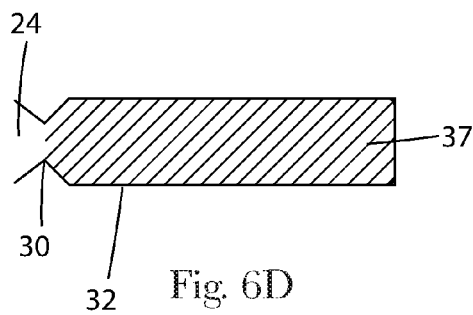

As illustrated in FIGS. 5A-5D, as the conventional high variable pressure injection molding machine begins to inject molten thermoplastic material 24 into a mold cavity 32 through the gate 30, the high injection pressure tends to inject the molten thermoplastic material 24 into the mold cavity 32 at a high rate of speed, which causes the molten thermoplastic material 24 to flow in laminates 31, most commonly referred to as laminar flow (FIG. 5A). These outermost laminates 31 adhere to walls of the mold cavity and subsequently cool and freeze, forming a frozen boundary layer 33 (FIG. 5B), before the mold cavity 32 is completely full. As the thermoplastic material freezes, however, it also shrinks away from the wall of the mold cavity 32, leaving a gap 35 between the mold cavity wall and the boundary layer 33. This gap 35 reduces cooling efficiency of the mold. Molten thermoplastic material 24 also begins to cool and freeze in the vicinity of the gate 30, which reduces the effective cross-sectional area of the gate 30. In order to maintain a constant volumetric flow rate, the conventional high variable pressure injection molding machine must increase pressure to force molten thermoplastic material through the narrowing gate 30. As the thermoplastic material 24 continues to flow into the mold cavity 32, the boundary layer 33 grows thicker (FIG. 5C). Eventually, the entire mold cavity 32 is substantially filled by thermoplastic material that is frozen (FIG. 5D). At this point, the conventional high pressure injection molding machine must maintain a packing pressure to push the receded boundary layer 33 back against the mold cavity 32 walls to increase cooling.

A substantially constant pressure injection molding machine, on the other hand, flows molten thermoplastic material into a mold cavity 32 with a constantly moving flow front 37 (FIGS. 6A-6D). The thermoplastic material 24 behind the flow front 37 remains molten until the mold cavity 37 is substantially filled (i.e., 99% or more filled) before freezing. As a result, there is no reduction in effective cross-sectional area of the gate 30, and a constant injection pressure is maintained. Moreover, because the thermoplastic material 24 is molten behind the flow front 37, the thermoplastic material 24 remains in contact with the walls of the mold cavity 32. As a result, the thermoplastic material 24 is cooling (without freezing) during the fill portion of the molding process. Thus, the cooling portion of the injection molding process need not be as long as a conventional process.

Because the thermoplastic material remains molten and keeps moving into the mold cavity 32, less injection pressure is required than in conventional molds. In one embodiment, the injection pressure may be 6,000 psi or less. As a result, the injection systems and clamping systems need not be as powerful. For example, the disclosed substantially constant injection pressure devices may use clamps requiring lower clamping forces, and a corresponding lower clamping power source. Moreover, the disclosed injection molding machines, because of the lower power requirements, may employ electric presses, which are generally not powerful enough to use in conventional class 101 and 102 injection molding machines that mold thinwall parts at high variable pressures. Even when electric presses are sufficient to use for some simple, molds with few mold cavities, the process may be improved with the disclosed substantially constant injection pressure methods and devices as smaller, less expensive electric motors may be used. The disclosed constant pressure injection molding machines may comprise one or more of the following types of electric presses, a direct servo drive motor press, a dual motor belt driven press, a dual motor planetary gear press, and a dual motor ball drive press having a power rating of 200 HP or less.

Test Data

A mold viscosity test was completed for a test mold, which was used to generate the data in the force vs. L/T chart above. This test determined the optimal injection rate was 6" per second. An additional rate of 8" per second was run to illustrate the relationship between injection rate and molding pressure. As mentioned above, the current industry practice is to inject at the maximum rate the molding press is capable of achieving. The data below illustrates that increasing injection rate leads to substantial increases in molding pressures, such as indicated by the 8" per second data runs. Injecting at even faster rates such as 10" per second, 20" per second or faster, will lead to substantial increases in pressure. The test data is summarized in the tables below.

| | | | Data for Peak Power Flow Factor vs. L/T Graph | | | |
|---|---|---|---|---|---|---|
| Material | Thickness | L/T | Peak Power Flow Factor @ 8 in/s | Peak Power Flow Factor @ 6 in/sec | Peak Power Flow Factor for New Process | Graph Labels |
| 35 MFI | 2 | 62.5 | 420.15 | 360.53 | 6.15 | 35 MFI: PPFF @ 8 in/s Conventional |
| | 2 | 125 | 560.70 | 400.98 | 18.13 | 35 MFI: PPFF @ 6 in/s Conventional |
| | 2* | 185 | 534.29 | 397.56 | 82.71 | 35 MFI: PPFF New Process |
| | 2 | 240 | 568.47 | 404.40 | 130.28 | |
| 12 MFI | 2 | 62.5 | 733.61 | 526.84 | 22.82 | 12 MFI: PPFF @ 8 in/s Conventional |
| | 2 | 125 | 687.22 | 492.85 | 103.45 | 12 MFI: PPFF @ 6 in/s Conventional |
| | 2 | 185 | 675.69 | 518.06 | 136.84 | 12 MFI: PPFF New Process |
| | 2 | 240 | 703.58 | 528.70 | 159.89 | |
| 55 MFI | 2 | 62.5 | 444.59 | 291.68 | 7.61 | 55 MFI: PPFF @ 8 in/s Conventional |
| | 2 | 125 | 473.08 | 344.33 | 42.70 | 55 MFI: PPFF @ 6 in/s Conventional |
| | 2 | 185 | 490.32 | 353.19 | 62.25 | 55 MFI: PPFF New Process |
| | 2 | 240 | 547.91 | 377.98 | 43.60 | |

| | Thickness | L/T | Values |
|---|---|---|---|
| Reference Line | 2 | 62.5 | 157.25 |
| | 2 | 125 | 223.89 |
| | 2 | 185 | 245.02 |
| | 2 | 240 | 268.93 |

*The Peak Power Flow Factor data point for the New Process using the 35 MFI at a 185 L/T was calculated using the trendline equation ($y = 1.0857 x - 80.383$); where $x$ = L/T value, and $y$ = peak power flow rate.

| | | | Summary of Peak Volumetric Flow Rate Data | | |
|---|---|---|---|---|---|
| Material | Thickness | L/T | Volumetric Flow Rate ($m^3/s$) @ 8 in/s | Volumetric Flow Rate ($m^3/s$) @ 6 in/s | Volumetric Flow Rate ($m^3/s$) for New Process |
| 35 MFI | 2 | 62.5 | 9.160E−05 | 8.262E−05 | 4.967E−06 |
| | 2 | 125 | 1.167E−04 | 9.339E−05 | 1.610E−05 |
| | 2* | 185 | 1.185E−04 | 9.160E−05 | 3.719E−05 |
| | 2 | 240 | 1.185E−04 | 9.160E−05 | 7.671E−05 |
| 12 MFI | 2 | 62.5 | 1.042E−04 | 8.441E−05 | 1.038E−05 |
| | 2 | 125 | 1.131E−04 | 8.980E−05 | 3.791E−05 |
| | 2 | 185 | 1.149E−04 | 8.980E−05 | 4.300E−05 |
| | 2 | 240 | 1.167E−04 | 8.980E−05 | 6.725E−05 |
| 55 MFI | 2 | 62.5 | 1.006E−04 | 8.441E−05 | 8.360E−06 |
| | 2 | 125 | 1.167E−04 | 9.519E−05 | 3.327E−05 |
| | 2 | 185 | 1.203E−04 | 9.519E−05 | 4.959E−05 |
| | 2 | 240 | 1.203E−04 | 9.519E−05 | 4.669E−05 |

*The Volumetric Flow Rate data point for the New Process using the 35 MFI at a 185 L/T was calculated using the trendline equation ($y = 2E-06e0.0158x$); where $x$ = L/T value, and $y$ = volumetric flow rate.

| Material | MFI |
|---|---|
| Braskem FPT350WV3 | 35 |
| Braskem FT120W2 | 12 |
| Flint Hills 5155 | 55 |

| Injection Screw Data | |
|---|---|
| Screw Diameter (mm) | 30 |
| Injection Area ($mm^2$) | 706.86 |
| Injection Area ($in^2$) | 1.096 |

| Conversion factors |
|---|
| 1 in = 0.0254 m |
| 1 mm = 0.03937 in |

| Conversion factors |
|---|
| 1 $in^3/s$ = 16.38706 $cm^3/s$ |
| 1 psi = 6894.757 pa |
| 1 Watt = 0.00134 hp |

When comparing the peak flow rate and peak power levels required to mold an injection molded part, the melt temperatures and mold temperatures should be consistent between the conditions run for both the conventional and the constant pressure process. Furthermore, these temperature settings should are generally based on the recommended temperatures from the resin manufacturer or within suitable ranges to ensure the resin is processed as intended by the manufacturer.

The disclosed substantially constant pressure injection molding machines advantageously reduce total cycle time for the molding process while increasing part quality. Moreover, the disclosed substantially constant pressure injection molding machines may employ, in some embodiments, electric presses, which are generally more energy efficient and require less maintenance than hydraulic presses. Additionally, the disclosed substantially constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed substantially constant pressure injection molding machines may be modified to fit delivery needs and are more easily customizable for particular molded parts.

Additionally, the disclosed substantially constant pressure injection molding machines and methods allow the molds to be made from softer materials (e.g., materials having a Rc of less than 30), which may have higher thermal conductivities (e.g., thermal conductivities greater than 20 BTU/HR FT ° F.), which leads to molds with improved cooling capabilities and more uniform cooling.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low, substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of injection molding a thinwall part at a substantially constant pressure, the method comprising:
   providing an injection molding machine having an injection system and a mold with a mold cavity having a L/T ratio of more than 100;
   operating the injection system to advance a shot of a molten thermoplastic material into the mold cavity such that a flow rate of the injection system increases until a predetermined injection pressure is reached; and
   adjusting a filling pressure profile to cause the flow rate of the injection system to peak within a first 30% of the mold cavity being filled; and
   reducing the flow rate of the injection system to maintain a substantially constant injection pressure from when the predetermined injection pressure is reached until the mold cavity is at least substantially filled with thermoplastic material.

2. The method of claim 1, wherein the adjusting includes adjusting the filling pressure profile to cause the flow rate of the injection system to peak within a first 20% of the mold cavity being filled.

3. The method of claim 1, wherein the adjusting includes adjusting the filling pressure profile to cause the flow rate of the injection system to peak within a first 10% of the mold cavity being filled.

4. The method of claim 1, wherein the operating includes operating the injection system to maintain a substantially continuous and moving flow front of the molten thermoplastic material that moves without hesitation as the shot advances through the mold cavity.

5. The method of claim 1, wherein the operating includes operating the injection system to fill the mold cavity at least 99% full with the molten plastic material, before the thermoplastic material begins to freeze at a flow front thereof.

6. The method of claim 1, wherein the providing includes providing the injection molding machine having the mold wherein the mold cavity has an L/T ratio of 200 or greater.

7. The method of claim 1, wherein the reducing includes reducing the power of the injection system to maintain the substantially constant injection pressure, which fluctuates no more than 30%.

8. The method of claim 1, wherein the reducing includes reducing the power of the injection system to maintain the substantially constant injection pressure, which fluctuates no more than 20%.

9. The method of claim 1, wherein the reducing includes reducing the power of the injection system to maintain the substantially constant injection pressure, which is less than 10,000 psi.

10. The method of claim 1, wherein the reducing includes reducing the power of the injection system to maintain the substantially constant injection pressure, which is less than 8,000 psi.

11. The method of claim 1, wherein the reducing includes reducing the power of the injection system to maintain the substantially constant injection pressure, which is less than 7,000 psi.

12. The method of claim 1, wherein the reducing includes reducing the power of the injection system to maintain the substantially constant injection pressure, which is less than 6,000 psi.

13. The method of claim 1, wherein the reducing includes reducing the power of the injection system to maintain the substantially constant injection pressure from when the predetermined injection pressure is reached until the mold cavity is completely filled with the thermoplastic material.

* * * * *